(12) United States Patent
Yin et al.

(10) Patent No.: US 10,187,435 B2
(45) Date of Patent: Jan. 22, 2019

(54) QUEUED SHARING OF CONTENT IN ONLINE CONFERENCING

(71) Applicant: Cisco Technology, Inc., San Jose, CA (US)

(72) Inventors: Huahua Yin, Jiangsu (CN); Qi Shi, Jiangsu (CN); Hua Ouyang, Jiangsu (CN)

(73) Assignee: Cisco Technology, Inc., San Jose, CA (US)

( * ) Notice: Subject to any disclaimer, the term of this patent is extended or adjusted under 35 U.S.C. 154(b) by 457 days.

(21) Appl. No.: 14/550,231

(22) Filed: Nov. 21, 2014

(65) Prior Publication Data

US 2016/0149968 A1 May 26, 2016

(51) Int. Cl.
*H04L 29/06* (2006.01)

(52) U.S. Cl.
CPC .......... *H04L 65/4038* (2013.01); *H04L 65/80* (2013.01)

(58) Field of Classification Search
CPC ................................... H04L 65/403
USPC ........................................ 709/204
See application file for complete search history.

(56) References Cited

U.S. PATENT DOCUMENTS

| 7,424,545 | B2* | 9/2008 | Ducheneaut ....... H04N 7/17318 709/203 |
| 8,495,496 | B2 | 7/2013 | Bastide et al. |
| 2004/0174830 | A1* | 9/2004 | Koskelainen ....... H04L 12/1822 370/260 |
| 2011/0307805 | A1* | 12/2011 | Bastide .................. G06Q 10/10 715/753 |

OTHER PUBLICATIONS

Brumby, Multi-Screen Sharing, The Sococo Blog, Aug. 13, 2013, sococo.com.

* cited by examiner

*Primary Examiner* — Joseph L Greene

(57) ABSTRACT

In one embodiment, a method includes sharing first content from a first computer of a first participant in an online conference. The first content is shared on a second display of a second computer of a second participant in the online conference. During the sharing of the first content, third content from a third computer of a third participant is queued in a queue at the second computer without display on the second display. For a transition from the first participant to the third participant in the online conference, the third content is shared on the second display of the second computer from the queue.

20 Claims, 10 Drawing Sheets

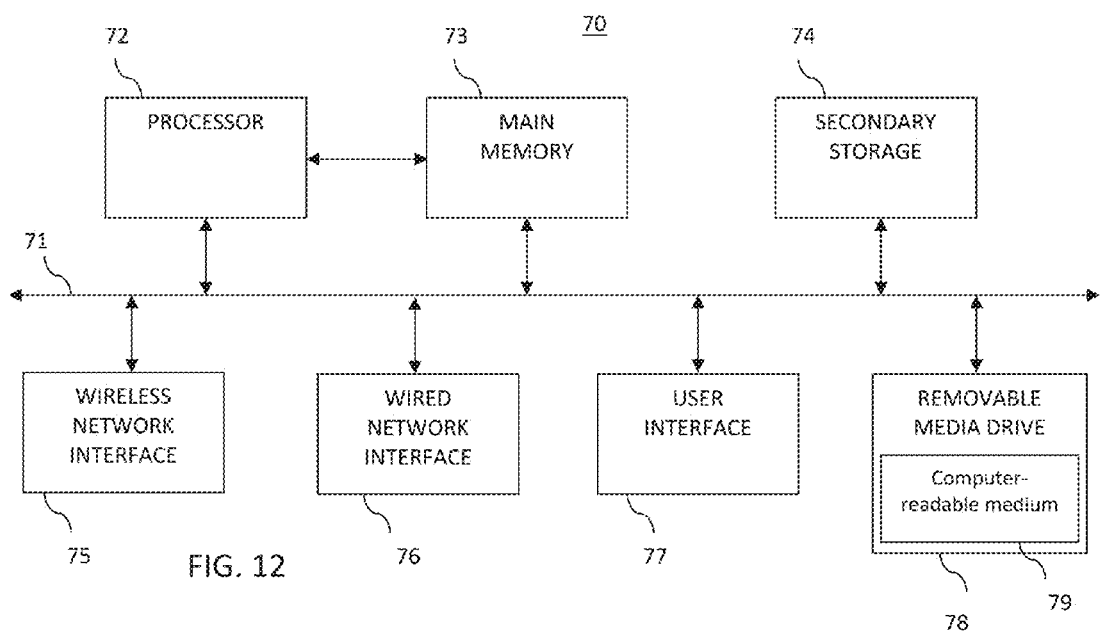

QUEUED SHARING OF CONTENT IN ONLINE CONFERENCING

TECHNICAL FIELD

This disclosure relates in general to the field of computer networks and, more particularly, to online conferencing with improved user experience.

BACKGROUND

In real-time online conferencing, desktop and document sharing by a presenter is common. The presenter shares content to other participants. Often, other participants also have content to share. For example, in a project meeting, a product manager, system architect, and developer all take turns sharing different content with each other. As each participant is given presenter privileges, the desktop or document for that participant is then shared with the other participants. For the other participants, the shared content transitions from one source (earlier presenter) to another source (later presenter). However, arranging for the change in source of shared content through the conference server may result in a delay of seconds, such as 10-30 seconds. The conference server acquires and distributes the new content upon the switch, introducing an undesired delay in the online meeting.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

FIG. 12 is a block diagram of an online conferencing device, according to one embodiment, for pre-sharing content.

DESCRIPTION OF EXAMPLE EMBODIMENTS

Overview

Figure 1:
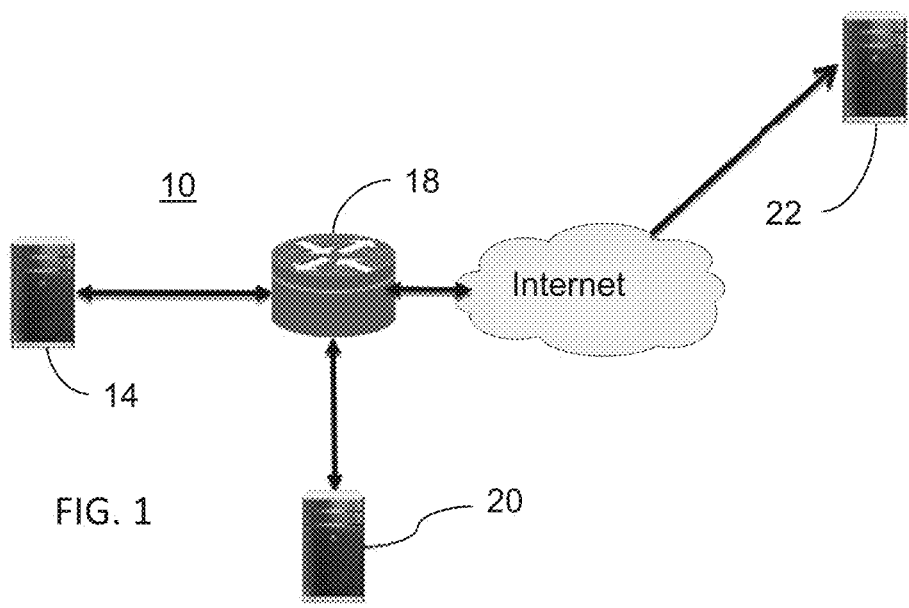
FIG. 1 is a simplified block diagram of an example network for pre-sharing content in online conferencing.

During presentation of content from one source at distributed destinations, the content from another source is locally queued at the distributed destinations. Upon a switch in sources, the queued content is presented. Since the queued content is pre-shared with the distributed destinations, the switch over to the subsequent content occurs rapidly. In online conferencing, the content viewed by the participants may switch from one presenter/participant to another rapidly due to pre-sharing the content.

In one aspect, a method includes sharing first content from a first computer of a first participant in an online conference. The first content is shared on a second display of a second computer of a second participant in the online conference. During the sharing of the first content, third content from a third computer of a third participant is queued in a queue at the second computer without display on the second display. For a transition from the first participant to the third participant in the online conference, the third content is shared on the second display of the second computer from the queue.

In another aspect, logic is encoded in one or more non-transitory computer-readable media that includes code for execution. When executed by a processor, the code causes the processor to: receive, at a conference server, first content from a first processor of a first participant in an online meeting; transmit, from the conference server in a sharing channel of the online meeting, the first content to other participants of the online meeting, the sharing channel corresponding to display of shared information; receive, at the conference server, second content from a second processor of a second participant in the online meeting; transmit, from the conference server in a pre-sharing channel of the online meeting, the second content to other participants of the online meeting, the pre-sharing channel corresponding to no display of the shared information; and indicate, by the conference server, a switch of the second content from the pre-sharing channel to the sharing channel.

In yet another aspect, an arrangement includes an interface configured to transmit shared content over time to a conference sever and to receive content to be shared. The arrangement also includes a processor configured to store the content to be shared, to cause display of the shared content on a display, and to replace, on the display, the shared content with the content to be shared. The content to be shared is received before a transmission of the shared content and before the replacing of the shared content with the content to be shared.

Example Embodiments

There is a sharing-switch-delay problem when switching presenters in an online meeting. When switching the presenter from presenter A to presenter B, a delay of seconds occurs. Since the sharing content comes from different presenters, the participants' computers join a different sharing channel for the switch. For the participant, a current sharing window of the online meeting is exited, static, or hidden until the sharing window is ready to show the next presenter's sharing content.

The delay may be avoided by pre-sharing. By identifying the candidate presenter before that candidate presenter is to share content, the content, such as a first frame to be shared, is pre-shared with the participants, but not displayed. Once a share command is sent to the attendees for transitioning presenters, the attendee meeting client immediately renders the new content (pre-share content) as the first frame is locally available due to pre-sharing. The content for the new presenter may be shared in less than one second. Delays in the meeting waiting for content may be avoided or reduced.

In other embodiments, the pre-sharing is used in other contexts than an online conference. The first frame of information to be presented at multiple destinations is shared with those destinations even though information from another source is being presented at the destinations. Upon a video stream or other source-content switch, the content from the new source is available without waiting for transmission from the other source. So long as there are multiple video or content sources in one session and a system is to switch display source from one to another, then the first frame or pre-sharing mechanism may avoid the switch-delay (time-waiting) issue and improve the user experience. Example uses include web camera switching, web television, or other broadcast video or streaming. The description below uses the online conferencing example, but the pre-sharing may be used in other distributed content systems that switch between different sources of content.

FIG. 1 shows an example network 10 for online conferencing. A media session between end-point devices 14, 20 and 22 or peers is created. Any number of end-point devices 14, 20, and 22 may be used, such as just two. The online conference is hosted by the network 10 for providing audio, video, and/or synthetic content between the end-point devices 14, 20, and 22. For video conferencing, the online conferencing server 18 may combine decoded inputs from different end-point devices 14 and 20 for encoding a combined video stream. For video or other online conferencing, the online conferencing server 18 may provide shared content from a presenter combined with an interaction from an attendee. In one embodiment, the network 10 supports operation of a telepresence or WebEx system from Cisco, but other online conferencing may be provided.

Additional, different, or fewer components may be provided in the network 10. For example, additional or fewer end-point devices to participate in a given media session, additional third-party servers, or different networks are provided. As another example, the online conferencing server 18 is not provided, with an end-point device 14, 20, 22 instead hosting the video conference. In other examples, the network 10 may be many different devices connected in a local area network, wide area network, intranet, virtual local area network, the Internet, or combinations of networks. Any form of network may be provided, such as transport networks, data center, or other wired or wireless network. The network 10 may be applicable across platforms, extensible, and/or adaptive to specific platform and/or technology requirements.

The network devices (e.g., end-point devices 14 and 20) of the network 10 are in a same room, building, facility or campus, such as part of a same enterprise network. In other embodiments, the network 10 is formed with devices distributed throughout a region, such as in multiple states and/or countries. The end-point devices 14, 20, 22 may be in different networks.

The network devices are connected over links through ports. Any number of ports and links may be used. The ports and links may use the same or different media for communications. Wireless, wired, Ethernet, digital subscriber lines (DSL), telephone lines, T1 lines, T3 lines, satellite, fiber optics, cable, cellular, and/or other links may be used. Corresponding interfaces are provided as the ports.

The online conferencing server 18 is a server for managing or controlling the conference. The online conferencing server 18 receives any inputs, such as audio, video, and/or user inputs, from the various end-point devices 14, 20, 22, determines information to output as part of the conference from the inputs, and transmits shared content, audio, and/or video to the end-point devices 14, 20, 22. In one embodiment, the online conferencing server 18 is a decoder and an encoder for receiving encoded inputs from the end-point devices 14 and 20, decoding the inputs, assembling video (e.g., combining input videos) and encoding the assembled video for output to any or all of the end-point devices 14, 20, and/or 22. The online conferencing server 18 is an application specific integrated circuit, a computer, a conference server, or other hardware. Any now known or later developed conferencing server or host may be used.

Any number of end-point devices 14, 20, 22 may be provided. The end-point devices 14, 20, 22 are computers, conference servers, tablets, cellular phones, Wi-Fi capable devices, laptops, mainframes, voice-over-Internet phones, or other user devices participating in a media session. The end-point devices 14, 20, 22 connect with wires, such as Ethernet cables, or wirelessly, such as with Wi-Fi. The connection may be relatively fixed, such as for personal computers connected by wires to switches. The connection may be temporary, such as associated with mobile devices. The end-point devices 14, 20, 22 may include encoders and/or decoders.

The end-point devices 14, 20, 22 may include one or more user input devices. For example, a mouse and keyboard are provided. As another example, a touch screen is provided. The end-point devices 14, 20, 22 include a microphone or speaker that may act as a microphone. One or more of the end-point devices 14, 20, 22 may include a camera. A microphone and speaker allow for audio communications as part of the video or online conference. A camera and display allow for video of the presenter and/or attendees as part of the video or online conference. Video may not be provided in other embodiments. The displays of the end-point devices 14, 20, 22 allow for display of shared content, such as display of the desktop, conference window, or document of a presenter. For example, a document or application is displayed as shared content on the displays of the end-point devices 20 and 22 where the shared content is hosted or originates from the end-point device 14.

A processor, computer, server, memory, or other device creates and/or captures synthetic data at one or more end-point devices 14, 20, 22. For example, a personal computer or conference server generates a POWER POINT or other presentation using software or a program. The synthetic content may be captured in real-time. Alternatively, the synthetic content is captured only upon a trigger, such as a change in the content or display.

At any given time, one or more of the end-point devices 14, 20, 22 are capturing content, audio and/or video. Any given end-point device 14, 20, 22 may be capturing content, audio, video, or combinations thereof at a given time. The operation may change over time, such as one end-point device 14 capturing while the local attendee is a presenter and then a different end-point device 14, 20, 22 capturing when a transition as presenter to the attendee local to the different device occurs. Similarly, the input source at a given end-point device 14, 20, 22 may change, such as switching between camera capture and receipt of synthetic data as shared content. Any conferencing arrangement or operation may be provided.

The end-point devices 14, 20, 22 are configured to initiate or participate in a media session. The end-point devices 14, 20, 22 operate pursuant to a real-time protocol (RTP) or other communications protocol for video, audio, and/or shared content communications. As part of the media session, content from another source may be added or incorporated. For example, data from one or more authorized sources, such as a financial services server, search engine, drop box database, or other source, is to be included in the media session. The web content is requested pursuant to TCP/IP or other protocol. The presenter controls the shared content.

The various components of the network 10 are configured by hardware and/or software to operate for video or online conferencing. Logic is provided in one or more non-transitory computer-readable media for operating the end-point device 14, end-point device 20, end-point device 22, and/or conferencing server 18. The media is a non-transitory memory. Memories within or outside the network 10 may be used. The logic includes code for execution by a processor or processors, such as processors of the end-point devices 14, 20, 22 or conferencing server 18. When executed by a processor, the code is used to perform operations for pre-sharing and sharing content.

Figure 2:
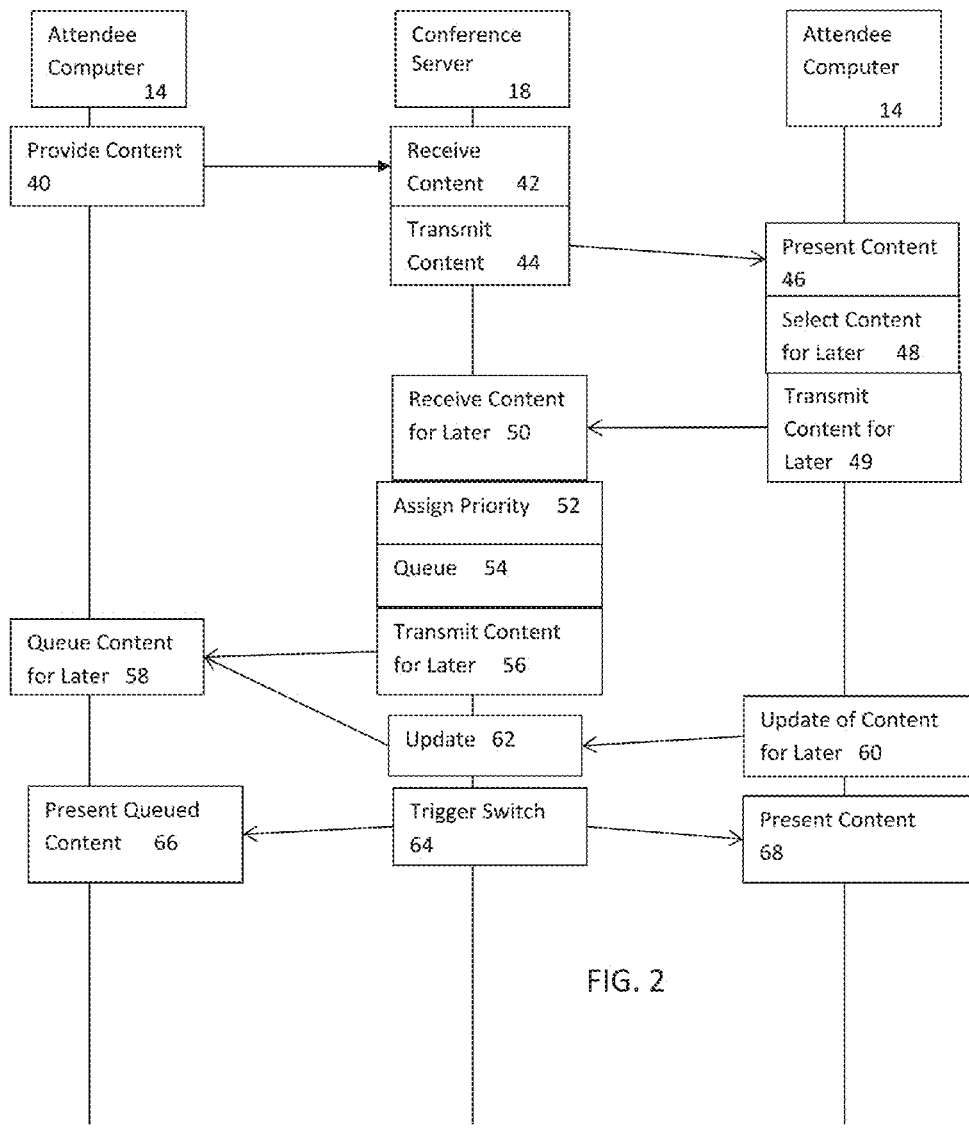
FIGS. 2 and 3 are example communications flow diagrams for different embodiments of pre-sharing content in online conferencing.

FIG. 2 shows a method for sharing and pre-sharing content in online conferencing. The online conferencing includes display of shared content. Video of the presenter and/or attendee may or may not be provided. In one embodiment, the online conference is a WebEx conference. In another embodiment, the online conference is a telepresence conference. Other online conferencing applications or programs may be used.

In the example of FIG. 2, two attendee computers and the conference server 18 are shown. This arrangement is used to represent switching the source of content between the attendees. Each attendee computer 14 provides the content for the online meeting at different times. The shared content being displayed on the attendee computers 14 is from the presenter at that time and is provided to other attendees by the conference server 18.

Figure 3:
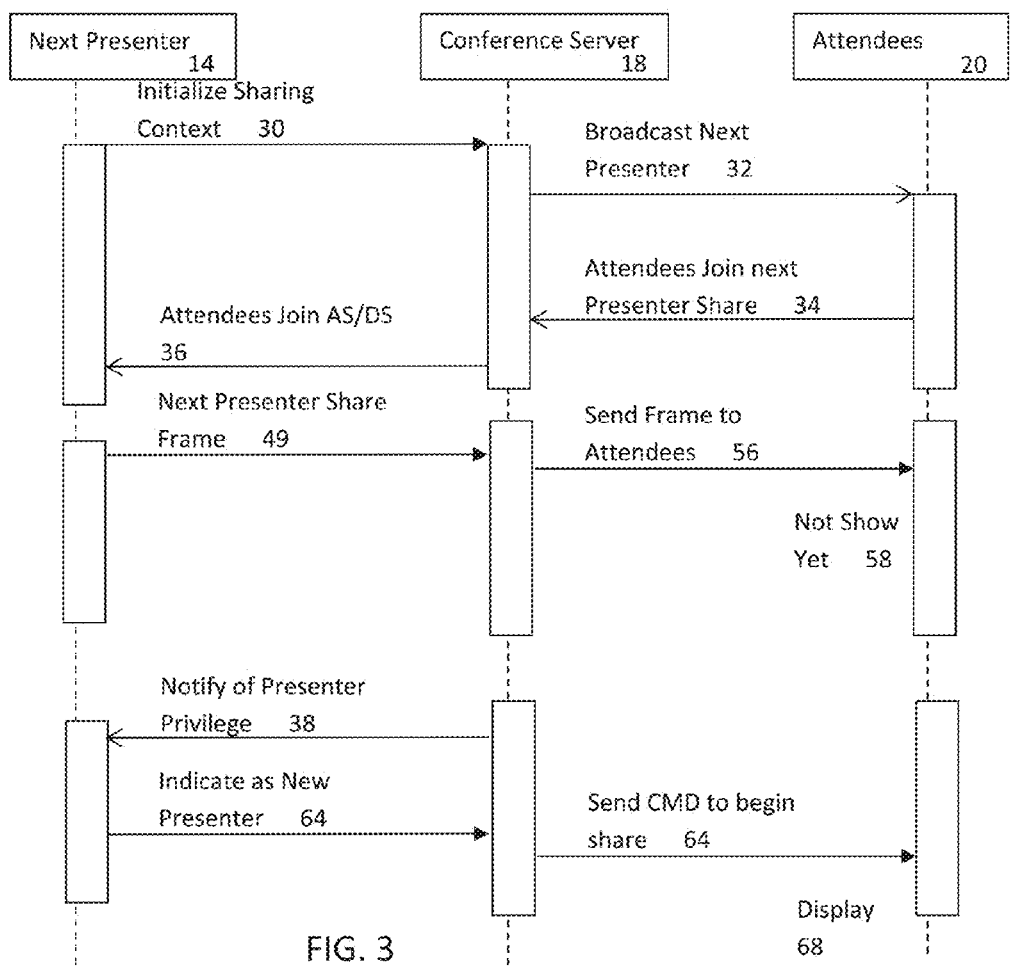

FIG. 3 also shows a method for sharing and pre-sharing content in online conferencing. FIG. 3 represents the interaction of the candidate presenter with the conference server 18 and the attendees 20, 22 in general. FIGS. 2 and 3 are described together below.

In alternative embodiments, an end-point device, such as for a presenter, performs the acts of the conference server 18. Other attendee computers may be included as well for receiving and/or presenting content. If the attendee providing the shared content changes, then a different attendee computer performs the actions of the presenter.

Various acts are shown in FIGS. 2 and 3. Additional, different, or fewer acts may be performed. For example, the acts of one attendee or the candidate presenter are performed without performing other acts. As another example, the acts of the conference server are performed without performing other acts. In yet another example, the assignment of priority of act 52, the server queuing of act 54, and/or the updates of acts 60 and/or 62 are not performed. In yet other examples, messaging and/or other acts for online conferencing are performed in addition to the acts shown, such as acts for determining which audio to transmit to the attendees and presenter.

The acts are performed in the order shown, as represented vertically with the first acts occurring at the top of FIGS. 2 and 3 and as represented by the arrows. FIGS. 2 and 3 represent the order of acts for a particular interaction. An on-going interaction with shared content by the same attendee or a different attendee is provided by repetition of the acts in any order.

The acts are performed by the attendee computers 14, 20, 22 and the conference server 18 as represented in FIGS. 2 and 3 where the horizontal line links the devices with the acts performed. In other embodiments, connected or local components, such as a server, processor, or different computer performs one or more of the acts. Similarly, the distribution of acts between the attendee computers 14, 20, 22 and the conference server 18 may be different.

Referring to FIG. 2, online conferencing is provided by performing acts 40-46. A presenter provides content in act 40. The presenter may be a host or other participant. The presenter uses a user interface to select content on the computer 14. The selected content is provided by the computer 14 to the server 18 for sharing with other participants in the conference.

The shared content is a document, presentation, application, or other information. For example, the shared content is a POWER POINT presentation, a table of a spreadsheet, a document, a .pdf, a web site, a picture, a video, and/or an application. The shared content may be from a local memory or downloaded from a remote source. In one embodiment, the shared content is a single window of information or multiple windows of information, such as any windows or delineated data in an online conference window. In another embodiment, the shared content is an entire desktop.

The shared content is from a presenter. The presenter selects the shared content, and the online conferencing application provides the shared content to the conference server 18 in act 42 for distribution to attendees. In other embodiments, one of the attendees provides the shared content, such as through permission or prior arrangement by the presenter and/or presenter's computer.

In act 42, shared content from the processor of the presenter computer 14 is received by the conference server. The conference server 18 (or source computer) transmits the shared content to other attendees in act 44. The content is transmitted to the other participants in a sharing channel, such as an RTP channel for the online conference.

In act 46, the attendee computers 14 present the shared content on screens or display devices. The shared content provided on the channel is received from the conference server 18 and displayed. The shared content on the presenter's screen is also presented on the screen of the attendee computer 14 and the screens of any other attendees. The desktop, application, or other shared content is shared between the attendees and presenter for the online conference. For example, the presentation of the shared content from the computer of the presenter on the screen of the attendee allows both the presenter and the attendee to view the same content.

During the display, the presenter or another attendee may be discussing some aspect of the shared content. The presenter may highlight, point to, manipulate, or otherwise interact with the shared content. This interaction is shown to the attendees in the attendee display. The audio is similarly provided to and output by the attendee computer 14.

At some point, another presenter is to be provided. The online conference is to switch from one presenter (e.g., host or participant) to another presenter (e.g., a different participant or back to the host). Referring to FIG. 3, the candidate presenter 14 initializes the sharing context in act 30. The candidate presenter is identified by a request from the candidate presenter. A request to present is sent from the computer of the candidate presenter before the candidate presenter is to present. Alternatively, the candidate presenter is scheduled by the host or otherwise identified by the conference server 18. For example, the candidate presenter is determined from a schedule or list provided by the computer of the host. The sharing context may be initialized in act 30 by the candidate presenter to acknowledge availability based on the list or schedule.

In act 32, the candidate presenter is broadcast to the attendee computers 20 by the conference server 18. In response, the attendee computers join in the candidate presenters sharing in act 34. A separate channel or communications process is established. The attendee meeting clients are included in the communications process by acknowledging joining the pre-share from that candidate presenter. The conference server 18 indicates the joining of attendees in an application share/desktop share (AS/DS) in act 36.

Figure 4:
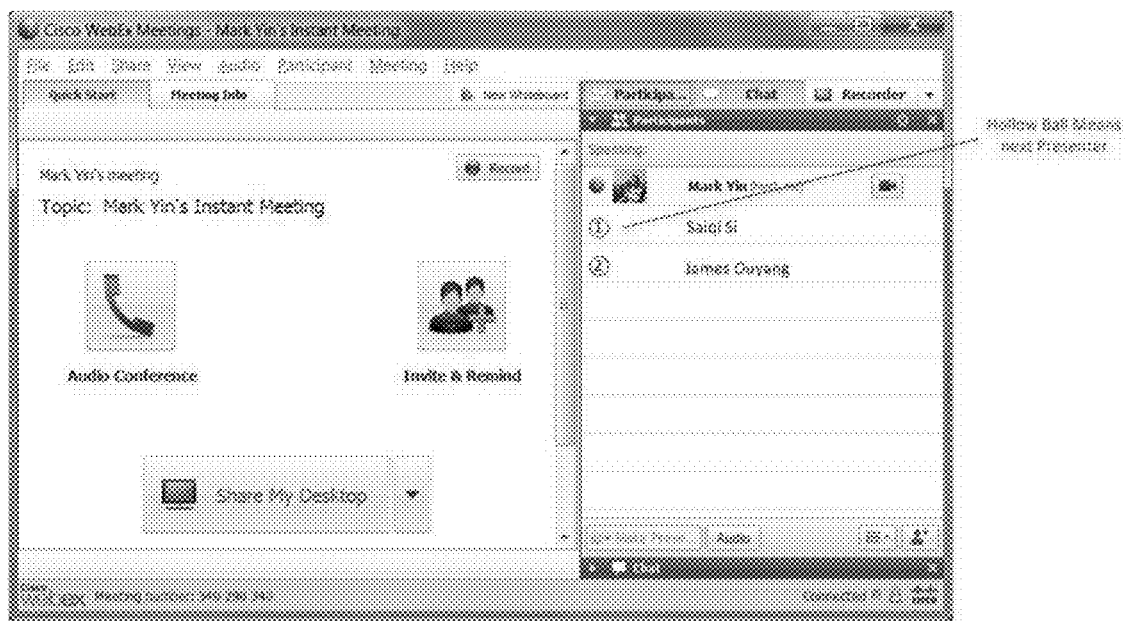
FIG. 4 shows an example screen showing a presenter order in an online conference.

The presenter list as currently queued may be displayed at the attendee computers by the meeting client. FIG. 4 shows an example. The current presenter is shown as the host Mark. Hollow-balls or other designators (e.g., order) indicate the next scheduled presenters (e.g., Saiqi and then James). These candidate presenters are listed as the next expected presenters, but the actual order of presenters may change or be other than shown. Being listed as a future presenter for the online conference does not make the participant a presenter, but is used for pre-sharing content.

In order to pre-share, the candidate presenter or one of the candidate presenters selects, in act 48, content to be later shared. The attendee computer 14 for the participant that is going to later present is used by that participant to select the content for eventual sharing in the online conference. Since the candidate presenter is not yet an actual presenter, the content being selected is not for current sharing. The content is for pre-sharing with the meeting clients of other attendee computers but without yet causing display of the pre-shared content. Once the candidate presenter becomes the actual presenter, the pre-shared content is displayed for sharing. Since the pre-shared content is available locally to the attendee computers due to pre-sharing, the meeting clients may immediately display without waiting for transfer of content.

Figure 5:
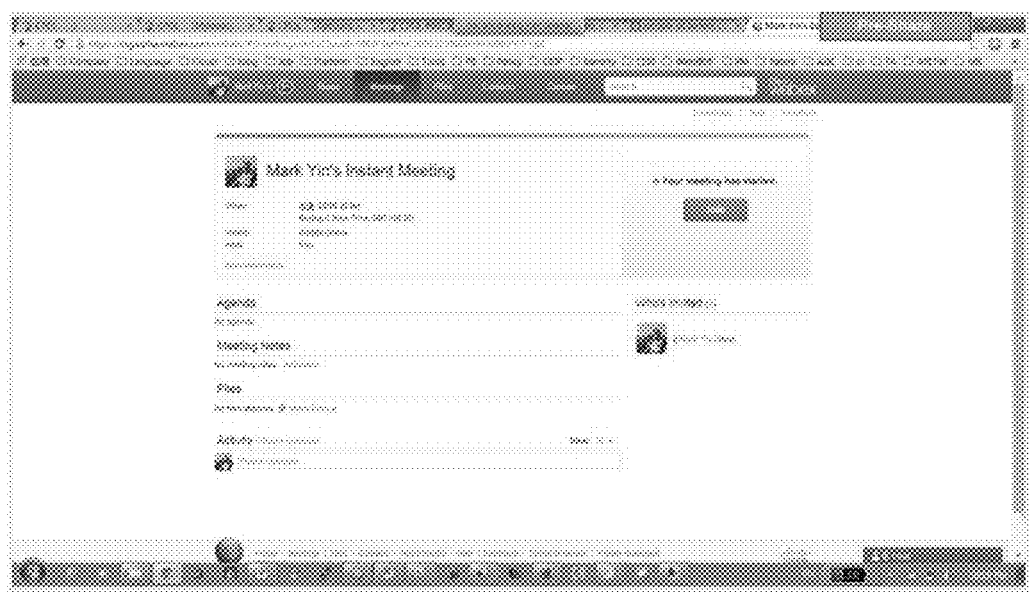
FIGS. 5 and 6 show examples for pre-share selection of a desktop and a document, respectively.
Figure 6:
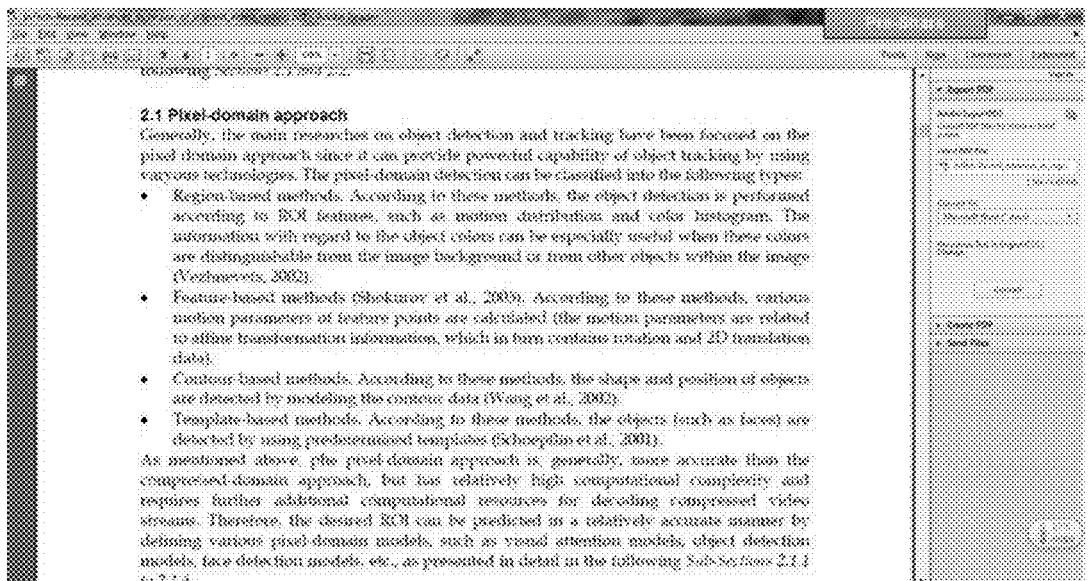

To select content to pre-share, the immediately next or any of the listed candidate presenters is provided with a pre-share option. FIGS. 5 and 6 show two examples. A button or other user interface option (e.g., menu selection) is presented by the meeting client of the participant computer for selecting content to pre-share. FIG. 5 shows the "pre-share" button as being part of the meeting client for sharing the desktop. Alternatively, selecting the pre-share button results in a menu of possible sharing options, such as documents, windows, tabs, or the entire desktop. FIG. 6 shows the "pre-share" button as part of a plug-in on a document program. By selecting the pre-share button, the corresponding document active in the document program is selected as the content for pre-sharing. The document program and/or the corresponding document (e.g., pdf, ppt, Word or other) are selected for application-based sharing. The selected content may be a video image, a TV screenshot, or any other image.

The content is captured as a first frame. The first frame is a frame of data representing an image as seen on the display by the candidate presenter or the participant selecting content. For example, only a portion of the document is visible on the desktop of the candidate presenter even with the document program being on-top or active. The first frame is the view of that portion of the document. As another example, the first frame is an image of the desktop of the candidate presenter. Alternatively, the selected content includes more than the visible portion, such as the first frame being a multiple page document.

When the candidate presenter wants to share a desktop or application window, the candidate presenter selects the "pre-share" button. The meeting client or program plugin captures the pre-sharing image. The candidate presenter may be watching a current presenter sharing content. In such cases, the candidate presenter still clicks the "pre-share" button to select the desktop or application (e.g., document).

Figure 7:
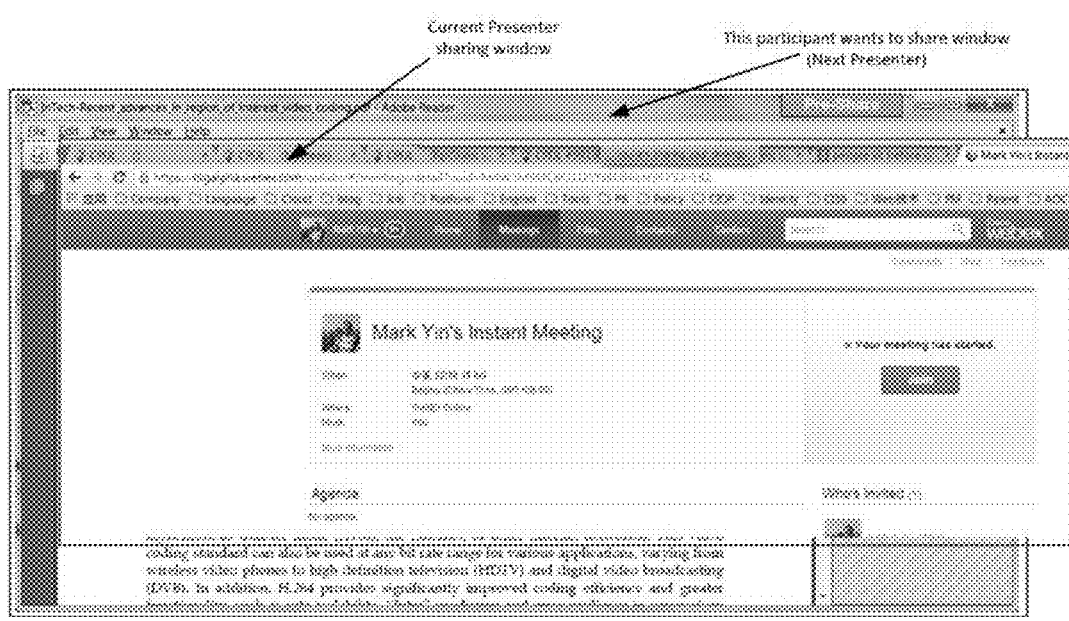
FIG. 7 shows an example masking of pre-share content.

The content for pre-sharing may be selected without being fully or even partially viewed. Instead, the masked content is selected, and the image of the content without the obstruction is provided as the pre-share content. FIG. 7 shows an example. The candidate presenter is viewing the meeting client and corresponding currently shared content. A .pdf blocked partially by the meeting client is selected for pre-sharing. The content captured for pre-sharing is the .pdf document as it would appear without the masking meeting client or other masking (e.g., obstructing) information. To generate the first frame or other content for pre-sharing, a screenshot of an active window or a window image of a hidden window is captured. The implementation for selecting pre-sharing content may be handled like obtaining AS/DS sharing content by a presenter.

Even where blocked, the candidate presenter then may view the initial image content in the first frame. In a preview mechanism, after the candidate presenter picks an application, document or desktop, clicking the pre-share button again or other activation causes an image of the first frame to be generated for the candidate presenter. This preview is generated before transmitting the selected content to the conference server 18. The candidate presenter may preview the effect or content selected and decide whether to send the captured content. The preview mechanism allows the candidate presenter to make sure that the captured first frame is the desired starting point for their presentation.

Referring again to FIGS. 2 and 3, the selected content for pre-sharing is transmitted by the next participant computer to a conference server in act 49. The first frame is transferred, such as a content file, to the meeting server 18. This transmission occurs during the sharing of content through repetition of acts 40-46. The current presenter continues to share content while the participant computer of the candidate presenter pre-shares content with the conference server 18.

In act 50, the conference server 18 receives the pre-sharing content from the processor of the candidate presenter computer 14. The first frame or other content is received from the candidate presenter for distribution by the conference server 18 to the other attendees.

Since there may be multiple candidate presenters, the pre-sharing content and corresponding candidate presenter are assigned a priority in act 52. The assignment is performed by the server 18 using any criterion or criteria. Alternatively, the host computer assigns the priority. The priority is assigned at the time of request to be a candidate presenter, after the request, or based on a predetermined assignment. For example, a presenter schedule is followed and the priority of the candidate presenter is assigned using the schedule. As another example, the priority is assigned on a first come, first priority basis unless over ridden by the host. In yet another example, a host assigned order is followed. The host assignment may be pre-determined or may be performed by the host during the online conference using a meeting user interface. For example, F is the meeting host, and the meeting has 5 participants: A, B, C, D and E. First, the host assigns the candidate presenter order as: A, B, C. Then, C sends a request to the host to share ahead of schedule. The host may or may not allow this change, such as altering the order to be C, A, B.

In one embodiment, the assignment of the order is automated. Any of various factors are used to assign the priority. One criterion is activity in the online meeting. The amount of time during which the participant is the primary speaker or speaking at all is measured. The more time that a participant speaks, the higher the priority for this participant as a candidate presenter. Activity may be indicated by mentions of the participant. The discussion may mention the participant by name, indicating a focus on that participant. The greater number of times detected by the conference server that a candidate presenter is mentioned, then the greater priority given to that next participant.

Another criterion may be a skillset match. The topic of the meeting is stored by the host computer, conference server, or participant computer. This topic may be accessed and compared against a computerized record for the participant. If the participant's expertise more closely matches the topic, then a higher priority is given to that candidate presenter as compared to candidate presenters with less of a match. For example, Tom's skillset is C++, and the current meeting topic is C++ language introduction. Accordingly, Tom is assigned a priority as the candidate presenter over George, whose skillset is human resources.

Another criterion is matching a degree of similarity between the pre-share content (e.g., first frame content) and the meeting topic. A word search, frequency count, or other semantic process may be used for calculating the degree of match. If the pre-sharing content matches more with the current meeting topic, then the degree is bigger. For example, the current topic is about C++ language and Tom is pre-sharing a C++ language PPT. Tom has larger degree of matching than George, whom is pre-sharing an organizational chart.

Yet another criterion is the candidate presenter's schedule. If the candidate presenter has a conflicting meeting with the current meeting, then the candidate presenter is assigned a higher priority than someone without a calendar conflict. For example, the current online conference meeting time is 9:00 am-10:00 am, and Tom's next meeting is 9:20 am. Tom is assigned a higher priority to avoid jeopardizing the later meeting. In another example, a meeting has A, B, C, D participants, and E is host. D is presenting and the candidate presenter order is A, B, C. The Meeting time is 9:00 am-10:00 am, B's next meeting is 9:40 am, and C's next meeting is 9:20 am. The conference server 18 automatically modifies the order as C, B, A.

One factor or a combination of factors may be used to assign priority using any weighting function. The priority is calculated for each candidate presenter, and the resulting values used to assign priority. In one example, the priority Index=(Presenter Activity)+(Skillset related)+(First Frame sharing content matching degree)+(Presenter Calendar Time). Any functions may be used for individual criterion. Any combination function for multiple criteria may be used. Weights may be used to normalize the criteria and/or to make some criteria more important than others.

The host may be able to override automated priority. For example, the conference server 18 notifies the host of any modification, so the host may manually order or override the change. The conference server 18 may provide the various criteria to the host, so that the host may view the criteria in the user interface for making an informed choice in assigning the priority. Manual and/or automatic assignment may be used.

In act 54, the pre-share content received by the conference server 18 is queued in a buffer. The conference server 18 stores the pre-share content for distribution. For each candidate participant providing pre-share content, the pre-share content is buffered. In alternative embodiments, the conference server 18 distributes the pre-share content without storage other than temporary storage used to distribute.

Figure 10:
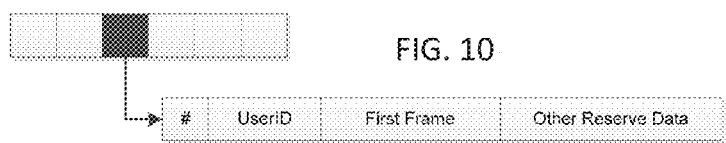
FIG. 10 shows an example queue.

To prevent over use of bandwidth and/or local storage by the participants, the conference server may buffer to account for a plurality of candidate presenters and corresponding pre-share content. Multiple first frames of pre-share content is stored. The first frames or pre-share content from the multiple candidate presenters is cached in memory in an order based on the assigned priority. Any queue or memory format may be used. For example, each candidate presenter is assigned a bin or location in the memory as shown in FIG. 10. The first frame or pre-share content, the identification of the candidate presenter, and the assigned priority number are stored. In other embodiments, the priority number is represented by the location in memory and is not separately stored. Other formats may be used, such as including storage for other information (e.g., other frames of pre-share content for the candidate presenter).

The conference server 18 and the attendee computers 14, 20, 22 have a same or different sized buffer or memory reserved for queuing pre-share content. The pre-share content is provided to the attendee computers. Where there is a threshold amount of pre-share content and/or candidate participants, only the highest priority pre-share content may be provided to the attendee computers. For example, the queue of the conference server has as many slots as there are candidate presenters, but the pre-share content of only the highest priority one, two, or three candidate presenters is queued by the attendee computers.

In act 56 of FIGS. 2 and 3, the conference server 18 transmits the pre-share content to other participants of the online meeting. The pre-share content of one or more candidate presenters is transmitted to the attendee computers of other attendees for caching or storage prior to sharing. The transmission is over the established pre-sharing channel of communication. In alternative embodiments, the same RTP channel as used for current sharing content or no specific channel is used, but the pre-share content is flagged as pre-share so as not to display the pre-shared content. The pre-share communications channel may be real time or not and corresponds to no display of the shared information. The pre-share content is being cached for later use, so may require less rapid transmission.

In act 58, the attendee computers 14, 20, 22 queue the pre-share content. The attendee computers 14, 20, 22 receive the pre-share content for one or more candidate presenters and store the pre-share content without display on the display of the attendee computers 14, 20, 22. The first frames or pre-share content representing the first image or multiple images to be shared by the candidate presenter is stored for later viewing. The window, document, application, or image captured from the selected pre-share content is queued until the candidate presenter becomes the presenter.

The receipt and queuing occurs while the content from a current presenter is shared and possibly displayed on the screen of the attendee computer 14, 20, 22. Since the candidate presenter or candidate presenters are not yet assigned as presenters, the content is not yet shared. The queuing occurs while someone else is assigned as the presenter and/or while content of the presenter is being shared or provided in regular updates. The storage allows availability of the pre-share content for the meeting client. Upon a change in presenter, the pre-shared content is locally available for more rapid presentation (e.g., display) than would occur without the local queuing.

As one or more candidate presenters share their first frames, these first frames are cached in the conference server 18, and in act 58, the conference server synchronizes the queues at the meeting clients of the attendee computers 14, 20, 22. If the size of the queue at the meeting client is smaller than at the conference server, then the queue at the attendee computers 14, 20, 22 stores less of the pre-shared content. For example, three or any number of first frames are stored locally, and more first frames are stored by the conference server 18. The pre-share content of the threshold number (e.g., 3) of candidate participants with the highest priority are stored on the attendee computers 14, 20, 22. The conference server 18 transmits, and the attendee computers 14, 20, 22 queue only the pre-share content for a limited number of candidate presenters. Any relative queuing between the conference server 18 and the meeting clients may be used to save network resources, save conference server resources, and/or more likely provide content rapidly upon presenter transition.

The candidate presenter may alter, in act 60, the pre-share content prior to sharing. For example, the candidate presenter edits a document or changes windows open on a desktop while a current presenter is sharing other content. Since the first frame's candidate presenter may move, zoom, adjust or otherwise change the window size, position, or content of the pre-share content, the first frame is possibly changed. This change occurs after having provided the pre-share content to the server 18 but prior to sharing of the pre-share content. In act 60, the attendee computer updates the pre-share content that has previously been shared. This update is communicated to the conference server 18. The communication may be of a replacement first frame or pre-share content or may indicate changes to previously queued pre-share content.

In act 62, the conference server 18 updates the pre-share content in the queue at the conference server 18 and causes the meeting clients to update the pre-share content in the queues of the attendee computers 14, 20, 22. The change at the candidate presenter computer 14, 20, 22 may trigger the update, such as triggering by the conference server 18 in response to receiving updated pre-share content. When a change is detected by the meeting client of the candidate presenter, then system immediately updates the first frame to the conference server queue, and the conference server 18 updates the meeting client queues of the participants.

Alternatively, a periodic check is performed. In order to synchronize changed pre-share content, to conference server 18 uses an interval timer to check for changes. The pre-share content is updated every N seconds, such as the conference server 18 checking the pre-share channel with the candidate presenter computer 14 for an update. The conference server 18 may request the pre-share content from the candidate presenter computer 14. The received pre-share content is compared with the pre-share content for that candidate presenter in the queue. If the pre-share content has changed, then the new pre-share content is saved and distributed. If not changed, then the pre-share content already queued is maintained. Alternatively, the pre-share content is updated regardless of whether a change occurred.

The update check may be performed less frequently for one or more candidate presenters than for other candidate presenters. For example, candidate presenters having a lower priority in the queue are more likely to present later than other candidate presenters. Accordingly, the check for updates may be less frequent. To optimize updating, a timer defining the period of checking is set differently for the pre-share content of different candidate presenters. In one embodiment, the position in the queue (e.g., assigned priority) is represented as Q and a base time period for update checking is T. The period of update check for the pre-share content of each candidate presenter is T×Q (e.g., where T is 3, 1×3 for the highest priority candidate presenter, 2×3 for the next, 3×3 for the next, and so on). Other differences in the timing interval for update may be used.

The pre-share content in the conference server queue or as last sent to the conference server 18 may be viewed by the corresponding candidate presenter using the meeting client. The viewing is used to manually or dynamically update the pre-share content. Alternatively, the candidate presenter may lock the pre-share content to avoid any updating. The host computer may have access to the pre-share content for display prior to transition of the presenters in order to approve or review the pre-share content before being shared with other participants.

In act 38 of FIG. 3, the new presenter computer 14 and/or the computers 20, 22 of the attendees are notified of a switch in the presenter. The conference server 18 initiates the switch in response to a current presenter indicating they are done, a host indication of a new presenter, time, or other trigger. The conference server 18 indicates the switch so that the meeting client of the new presenter informs the new presenter of the switch and/or reconfigures the user interface for presenter privileges. Attendee computers 20, 22 are notified for updating the presenter identification and the candidate presenter list.

When the switch occurs or the new presenter computer 14 is given the right to present, the meeting client of the new presenter causes the selected content to be active and displayed above any other programs or windows on the computer display. The meeting client and/or the shared content are made the top content on the screen. Other programs or windows are minimized or placed behind the selected application or document. In the case of shared the desktop, the desktop may be left as is or may be altered to be in a same state as the last updated pre-share content. In an alternative, the meeting client flashes, highlights, fades in/out, or otherwise indicates the application, window, or other program showing the content to be shared. The new presenter, using the user interface, may then activate or switch to viewing the previously selected content.

In act 64, the indication of the switch also informs the meeting clients of the new presenter and informs the meeting clients to present the pre-share content of the new presenter. The command is to switch the channel from the share content channel of the previous presenter to the pre-share content of the new presenter for each meeting client at each attendee computer. The meeting client is to cease displaying content from the previous presenter and start displaying content from the new presenter.

The conference server 18 triggers the switch at the new presenter and the other participant computers 14, 20, 22 as represented in FIG. 2. Alternatively, the new presenter computer 14, in response to the indication as the new presenter, sends an acknowledgement to the conference server 18 as represented in FIG. 3. The conference server 18 then triggers the switch at other attendee computers 20, 22 in act 64. For example, a command (CMD) is sent to begin sharing.

Referring to FIGS. 2 and 3, the pre-share content is shared in acts 66 and 68. The meeting clients of the attendee computers 20, 22, in act 68, and the new presenter computer 14, in act 66, cause the pre-share content in the queues to be shared. In response to the command, the content shown on the display of the meeting client transitions. The locally cached pre-share content is used for display and is now shared content. The communications channel used by the meeting clients for display of content is changed to the new presenter in the transition. New sharing content may be pushed to the conference server 18 and then to attendees quickly as well due to using an already established communications channel.

As the online meeting progresses through presenters, the transition occurs for each new presenter. The pre-share content from each new presenter is queued locally by the meeting clients. At the time of transition, the pre-share content or first frames are displayed. The queue may be updated with pre-share content from another candidate presenter in preparation for another transition. Both the server and client's queue is updated. The list of candidate presenters may be updated and distributed to the attendee computers.

When the attendee as a new presenter starts sharing, then the pre-share content (first frame of data) may be destroyed as the channel for sharing provides content from the new presenter to the meeting clients through the conference server. Alternatively, the channel established for the pre-share content is converted into a channel for shared content.

Figure 8:
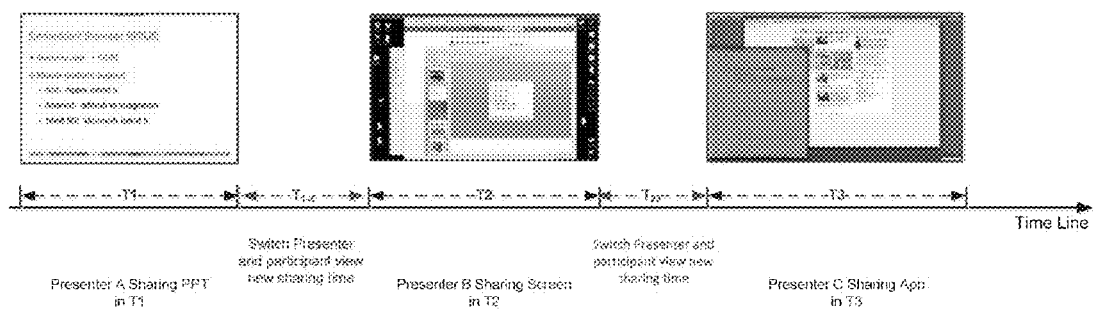
FIG. 8 shows an example of delay caused by switching presenters.
Figure 9:
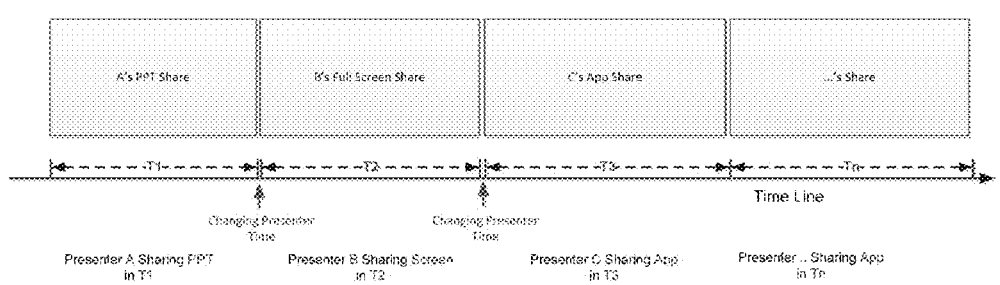
FIG. 9 shows an example of reduction in the delay due to pre-sharing.

The online conference smoothly (e.g., within a second or 0.5 seconds) switches from sharing the content of the previous presenter to sharing the content of the new presenter. FIGS. 8 and 9 compare a transition relying on establishing communications for sharing after the switch with a transition using pre-share content, respectively. If there is no pre-sharing, there is a delay between the switch to a new presenter and availability of shared content. It takes time for a new channel to be created, for the attendee computers to join the channel, for the presenter to share, for the shared content to be transferred, and for the attendee computer to render the shared content on the display. FIG. 8 shows this delay as $T_{1-2}$ and $T_{2-3}$. These delays may take more than two seconds (e.g., 10-30 seconds), causing a poor user experience and delay in the meeting.

FIG. 9 shows the use of pre-share content. When the presenter changes, the channel for content sharing by the new presenter is already established. The content to be shared (e.g., first frame) is already available at the attendee computers. As a result, the delay is lessened to the time to render the image on the display from the content. FIG. 9 shows this reduction in delay down to less than one or less than 0.5 seconds.

When the queued presenter receives the presenter privilege to share, the application, document, power point, window, or desktop of the new presenter is rapidly provided on the displays of the attendees. From the participants' user experience, once the presenter is changed, the sharing content is smoothly changed to the new presenter with no or littler waiting. The new content is provided in the same window or display region of the meeting client as the previous content. If the sharing window of the online meeting is showing on the display of the attendee, then the content of the first frame is shown to the participant.

Figure 11:
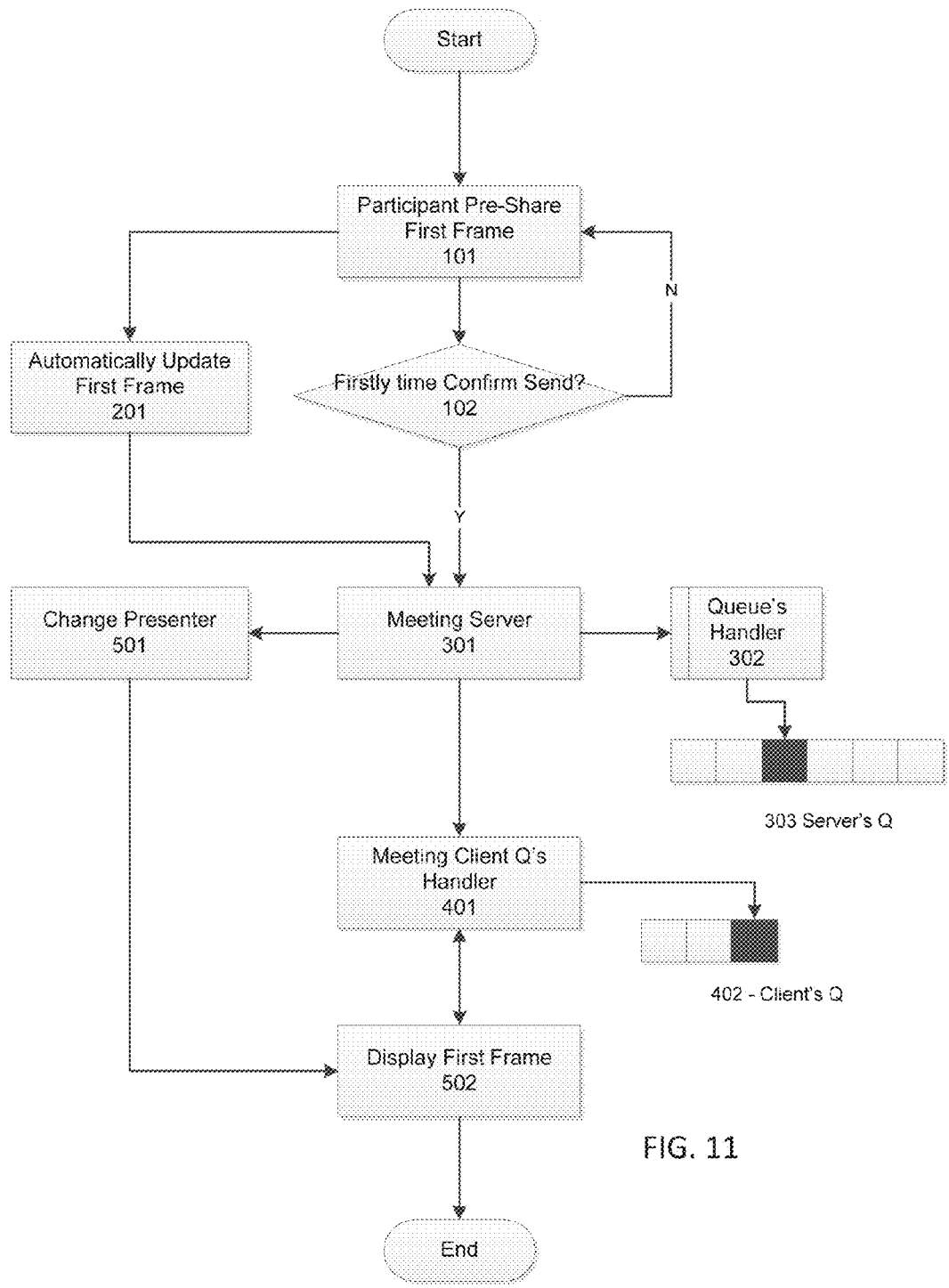
FIG. 11 is a flow chart diagram of one embodiment of a method for pre-sharing content.

FIG. 11 shows one embodiment of a flow chart of a method for pre-sharing content in an online conference. An example data flow for the pre-share content, the first frame or frames, for generation and display is shown.

Additional, different, or fewer acts may be provided for this workflow. For example, queuing in the conference server in act 302 is not provided. As another example, updates of the first frame in act 201 are not provided. Acts for presenting other content or other online meeting acts are provided in other examples.

In act 101, the candidate presenter generates the first frame. The pre-share content is selected, such as selecting an application, document, or desktop as the first frame. In act 102, the candidate presenter previews the selection. The selection is altered, edited, scrolled or left the same. The candidate presenter determines whether to send the first frame to the meeting server or not. Once ready, the candidate presenter sends the first frame or multiple frames of pre-share content to the meeting server in act 301. In act 201, the first frame or other pre-share content is automatically updated. The meeting server receives or checks for updates. If the candidate presenter has changed the selected content, then the first frame is updated.

In act 302, the meeting server updates the queue. The first frame or frames are stored in memory or cache as a queue. A separate slot 303 in the queue is provided for each candidate presenter. In act 401, the meeting server sends and the meeting clients of attendee computers receive the first frame of data. In act 402, the first frame of data is locally queued by the meeting clients. Any updates may similarly be sent and queued locally.

In act 501, the computer of the meeting host or other participant changes the presenter. The change results in the candidate presenter becoming the current presenter. The content of the current presenter is to be shared, so the meeting server broadcasts the instruction to the participant computers. The participant computers receive the instruction for changing presenters and modify the queue to position the content of the current or new presenter as the top of the queue. The queue of the meeting server is likewise modified. Alternatively, the pre-share content is selected and displayed without rearranging the queue. In act 502, the meeting clients of the attendee computers immediately or quickly display the first frame of data from the queue for the new presenter in response to the instruction. For example, the presenter is switched from presenter A to presenter B. Then, the meeting clients display presenter B's first frame immediately or quickly in the online meeting client user interface.

FIG. 12 is one embodiment of an apparatus or arrangement for pre-sharing content in online conferencing. The apparatus is shown as a simplified block diagram of an example network device, such as the end-point device 14, 20, 22, or conference server 18 of FIG. 1. In FIG. 12, the example network apparatus or device 70 corresponds to network elements or computing devices that may be deployed in the conferencing network 10. The network device 70 includes software and/or hardware to perform any one or more of the activities or operations for checking, verifying, updating, transmitting, receiving, queuing, and/or displaying for interaction by an attendee with shared content.

The configuration of the components discussed below for the network device 70 is from the perspective of an end-point device 14, 20, 22 belonging to a current presenter. The current presenter device 70 stores pre-share content from a candidate presenter while outputting content for the current sharing. In other embodiments, the network device 70 is configured for operation as the conference server, as a participant computer not associated with a presenter or candidate presenter, or as a participant computer associated with a candidate presenter.

The network device 70 includes a processor 72, a main memory 73, secondary storage 74, a wireless network interface 75, a wired network interface 76, a user interface 77, and a removable media drive 78 including a computer-readable medium 79. A bus 71, such as a system bus and a memory bus, may provide electronic communication between processor 72 and the other components, memory, drives, and interfaces of network device 70.

Additional, different, or fewer components may be provided. The components are intended for illustrative purposes and are not meant to imply architectural limitations of network devices. For example, the network device 70 may include another processor and/or not include the secondary storage 74 or removable media drive 78. As another example, the network device 70 connects with a camera and/or microphone. Each network device may include more or less components than other network devices.

The network device 70 is personal computer, tablet, smart phone, server, network processor, or other computer. In one embodiment, the network device 70 is a conferencing server or user computer (e.g., personal computer, laptop, smart phone, tablet, or mobile device) with conferencing capability or software. The network device 70 may be a computer with web browsing software where the web browser displays the conferencing information from a server.

In one embodiment, the network device 70 is part of a conferencing system, such as a telepresence system (from Cisco), WebEx system (from Cisco) or other online conference system. Any device for participating, hosting, and/or controlling online conferencing may be used.

Instructions embodying the activities or functions described herein may be stored on one or more external computer-readable media 79, in main memory 73, in the secondary storage 74, or in the cache memory of processor 72 of the network device 70. These memory elements of network device 70 are non-transitory computer-readable media. The logic for implementing the processes, methods and/or techniques discussed herein are provided on non-transitory computer-readable storage media or memories, such as a cache, buffer, RAM, removable media, hard drive or other computer readable storage media. Computer readable storage media include various types of volatile and nonvolatile storage media. Thus, 'computer-readable medium' is meant to include any medium that is capable of storing instructions for execution by network device 70 that cause the machine to perform any one or more of the activities disclosed herein.

The instructions stored on the memory as logic may be executed by the processor 72. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like.

The memory (e.g., external computer-readable media 79, in main memory 73, in the secondary storage 74, or in the cache memory of processor 72) also stores shared content, pre-share content (e.g., first frame or frames), a list of candidate presenters, and/or an identification of a current presenter.

The wireless and wired network interfaces 75 and 76 may be provided to enable electronic communication between the network device 70 and other network devices via one or more networks. In one example, the wireless network interface 75 includes a wireless network interface controller (WNIC) with suitable transmitting and receiving components, such as transceivers, for wirelessly communicating within the network 10. In another example, the wireless network interface 75 is a cellular communications interface. The wired network interface 76 may enable the network device 70 to physically connect to the network 10 by a wire, such as an Ethernet cable. Both wireless and wired network interfaces 75 and 76 may be configured to facilitate communications using suitable communication protocols, such as the Internet Protocol Suite (TCP/IP).

The network device 70 is shown with both wireless and wired network interfaces 75 and 76 for illustrative purposes only. While one or both wireless and hardwire interfaces may be provided in the network device 70, or externally connected to network device 70, only one connection option is needed to enable connection of network device 70 to the network 10. The network device 70 may include any number of ports using any type of connection option.

The network interfaces 75 and/or 76 may be configured to transmit audio, video, and/or shared content for online conferences. In one embodiment, the network interfaces 75 and/or 76 are configured to transmit shared content to participants via a conference server of an online conference. Updated shared content or content reflecting interaction by a presenter is transmitted to the computers for display to participants.

Additionally or alternatively, the network interfaces 75 and/or 76 may be configured to receive audio, video, shared content, and/or content to be shared for online conferences. In one embodiment, the network interfaces 75 and/or 76 are configured to receive content to be shared but not initially displayed. This pre-share content is received from the conference server for queuing or storage until needed. The pre-share content is received before a final transmission of the currently shared content and before replacing content being currently shared with the pre-share content of another presenter. The network interfaces 75 and/or 76 output content for sharing where the associated operator is the presenter. While presenting, content to be later shared by a different presenter is received by the interfaces 75 and/or 76. This receipt occurs while still or before completing sharing by the current presenter. The pre-share content is received before replacing the currently shared content of the current presenter with the content of the candidate presenter.

The processor 72, which may also be a central processing unit (CPU), is any general or special-purpose processor capable of executing machine readable instructions and performing operations on data as instructed by the machine readable instructions. The main memory 73 or other memory may be accessible to processor 72 for accessing machine instructions and may be in the form of random access memory (RAM) or any type of dynamic storage (e.g., dynamic random access memory (DRAM)). The secondary storage 74 may be any non-volatile memory, such as a hard disk, which is capable of storing electronic data including executable software files. Externally stored electronic data may be provided to computer 70 through one or more removable media drives 78, which may be configured to receive any type of external media 79, such as compact discs (CDs), digital video discs (DVDs), flash drives, external hard drives, or any other external media.

The processor 72 is configured by the instructions and/or hardware to store the content to be shared. When the content to be shared or an update for that content to be shared is received, the processor 72 causes storage of the content to be shared in a memory, such as a queue for the meeting client. The storage is in any of the memories (e.g., 73, 74). The processor 72 may store pre-share content from any number of candidate presenters, such as one, two, or more.

The processor 72 is configured to cause display of the shared content. While the operator is sharing in the online conference, the processor 72 both provides and extracts the shared content from the user interface 77. The content being shared by the operator is both presented on the display as well as provided to the interfaces 75 and/or 76 for sharing. The processor 72 is configured to cause the transmit by the interface 75 and/or 76 of the shared content as a document or screen of the display associated with the processor 72.

The processor 72 is configured to replace, on the display, the shared content with the content to be shared. In response to a transition in presenters from the operator of the processor 72 to another, the pre-share content of the other (i.e., new presenter) is obtained from the queue and rendered to the display of the user interface 77. The shared content of the operator is replaced with the content of the new presenter. The replacement on the display happens quickly, such as within less than 0.5 seconds from the trigger indicating a new presenter is received. Greater or lesser time may pass before replacement.

A user interface 77 may be provided in none, some or all devices to allow a user to interact with the network device 70. The user interface 77 includes a display device (e.g., plasma display panel (PDP), a liquid crystal display (LCD), or a cathode ray tube (CRT)). In addition, any appropriate input device may also be included, such as a keyboard, a touch screen, a mouse, a trackball, microphone (e.g., input for audio), camera, buttons, and/or touch pad. In other embodiments, only the display (e.g., touch screen) is provided.

Additional hardware may be coupled to the processor 72 of the network device 70. For example, memory management units (MMU), additional symmetric multiprocessing (SMP) elements, physical memory, peripheral component interconnect (PCI) bus and corresponding bridges, or small computer system interface (SCSI)/integrated drive electronics (IDE) elements. The network device 70 may include any additional suitable hardware, software, components, modules, interfaces, or objects that facilitate operation. This may be inclusive of appropriate algorithms and communication protocols that allow for the effective protection and communication of data. Furthermore, any suitable operating system is configured in network device 70 to appropriately manage the operation of the hardware components therein.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A method comprising:
sharing first content from a first computer of a first participant in an online conference, the first content shared on a display of each of a second computer of a second participant in the online conference, a third computer of a third participant in the online conference, and a third display of a fourth computer of a fourth participant in the online conference;
during the sharing of the first content, receiving, by a conference server, third content from the third computer and fourth content from the fourth computer;
during the sharing of the first content, queuing in a queue the third content and the fourth content at the conference server, where the third content and the fourth content are ordered in the queue based on a priority assigned to the third participant and the fourth participant by the conference server, the priority being based on a plurality of priority factors;
transmitting the queue to the second, third, and fourth computers without displaying the third content and the fourth content on the displays of the second, third, and fourth computers; and
for a transition from the first participant to the third participant in the online conference, sending, by the conference server, a trigger signal to inform the second, third, and fourth computers to switch from sharing the first content to sharing the third content on the displays of the second, third, and fourth computers from the queue.

2. The method of claim 1 wherein sharing the first content comprises sharing a document or a screen.

3. The method of claim 1 wherein sharing the first content comprises sharing from the first participant comprising a host.

4. The method of claim 1 further comprising receiving the first content, the third content, and the fourth content from the conference server of the online conference.

5. The method of claim 1 wherein queueing comprises storing a third frame of data representing a single image of the third content and storing a fourth frame of data representing a single image of the fourth content.

6. The method of claim 1 wherein queueing comprises queueing the third content as a window displayed by the third computer and queueing the fourth content as a window displayed by the fourth computer.

7. The method of claim 1 wherein sharing the third content comprises transitioning from a first channel for the sharing the first content to a third channel for sharing the third content in the online conference.

8. The method of claim 1 wherein sharing the third content comprises sharing the third content on the displays with the transition from the first content to the third content on the displays being less than 0.5 seconds.

9. The method of claim 1 further comprising:
transitioning sharing from the first content to the third content and then to the fourth content based on the priority of the third and fourth participants.

10. One or more non-transitory computer-readable storage media encoded with computer executable instructions, wherein the storage media:
receive, at a conference server, first content from a first processor of a first participant in an online meeting;
transmit, from the conference server in a sharing channel of the online meeting, the first content to other participants of the online meeting, the sharing channel corresponding to display of shared information;
receive, at the conference server, second content from a second processor of a second participant in the online meeting and third content from a third processor of a third participant in the online meeting;
assign, by the conference server, a priority to the first participant, the second participant, and the third participant based on a plurality of priority factors;
configure, by the conference server, in a queue the second content and the third content based on the priority;
transmit, from the conference server in a pre-sharing channel of the online meeting, the queue containing the second content and the third content to the other participants of the online meeting, the pre-sharing channel corresponding to no display of the shared information; and
indicate, by the conference server, to the other participants of the online meeting when to switch from presenting the first content of the sharing channel to presenting the second content from the pre-sharing channel.

11. The computer readable storage media of claim 10 wherein transmitting in the sharing channel and the pre-sharing channel comprises transmitting over a real-time protocol channel.

12. The computer readable storage media of claim 10 further comprising assigning an order of presenters based on the priority, the first participant being before the second participant and the third participant.

13. The computer readable storage media of claim 10 further comprising queueing, by the conferencing server, the second content and the third content in a buffer.

14. The computer readable storage media of claim 10 wherein indicating comprises commanding a switch from display of the first content to display of the second content.

15. The computer readable storage media of claim 10 further comprising updating the second content prior to the indicating by the conference server.

16. The method of claim 1, wherein the priority factors include one or more of:
   an amount of time each participant is speaking within the online conference;
   a number of times each participant is mentioned within the online conference;
   a skillset of each participant of the online conference;
   a degree of similarity between content of each participant and the first content; or
   a schedule of each participant of the online conference.

17. An apparatus comprising:
   a network interface unit configured to enable network communications; and
   a processor coupled to the network interface unit, and configured to:
      share first content from a first computer of a first participant in an online conference, the first content shared on a display of each of a second computer of a second participant in the online conference, a third computer of a third participant in the online conference, and a fourth computer of a fourth participant in the online conference;
      during the sharing of the first content, receive third content from the third computer and fourth content from the fourth computer;
      during the sharing of the first content, queue in a queue the third content and the fourth content at a conference server, where the third content and the fourth content are ordered in the queue based on a priority assigned to the third participant and the fourth participant by the conference server, the priority being based on a plurality of priority factors;
      transmitting the queue to the second, third, and fourth computers without displaying the third content and the fourth content on the displays of the second, third, and fourth computers; and
      for a transition from the first participant to the third participant in the online conference, sending, by the conference server, a trigger signal to inform the second, third, and fourth computers to switch from sharing the first content to sharing the third content on the displays of the second, third, and fourth computers from the queue.

18. The apparatus of claim 17, wherein queueing comprises storing a third frame of data representing a single image of the third content and storing a fourth frame of data representing a single image of the fourth content.

19. The apparatus of claim 17, wherein queueing comprises queueing the third content as a window displayed by the third computer and queueing the fourth content as a window displayed by the fourth computer.

20. The apparatus of claim 17, wherein sharing the first content comprises sharing a document or a screen.

* * * * *